United States Patent
Kotter

(10) Patent No.: US 12,555,837 B2
(45) Date of Patent: Feb. 17, 2026

(54) CELL MODULE HAVING A MEASURING DEVICE FOR DETECTING DEFORMATION AND DAMAGE OF A CELL MODULE FRAME

(71) Applicant: Bayerische Motoren Werke Aktiengesellschaft, Munich (DE)

(72) Inventor: Philip Kotter, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 489 days.

(21) Appl. No.: 18/121,178

(22) Filed: Mar. 14, 2023

(65) Prior Publication Data

US 2023/0318058 A1 Oct. 5, 2023

(30) Foreign Application Priority Data

Mar. 30, 2022 (DE) ...................... 10 2022 107 491.9

(51) Int. Cl.
| | |
|---|---|
| *H01M 10/48* | (2006.01) |
| *G01B 7/16* | (2006.01) |
| *G01R 31/374* | (2019.01) |
| *H01M 50/224* | (2021.01) |
| *H01M 50/242* | (2021.01) |

(52) U.S. Cl.
CPC .............. *H01M 10/48* (2013.01); *G01B 7/18* (2013.01); *H01M 10/486* (2013.01); *H01M 50/224* (2021.01); *H01M 50/242* (2021.01); *G01R 31/374* (2019.01); *H01M 2220/20* (2013.01)

(58) Field of Classification Search
None
See application file for complete search history.

(56) References Cited

U.S. PATENT DOCUMENTS

2022/0166077 A1* 5/2022 Gyulai ................ H01M 10/482

FOREIGN PATENT DOCUMENTS

| CN | 108878968 A | 11/2018 | |
|---|---|---|---|
| DE | 10 2016 013 345 A1 | 5/2017 | |
| DE | 10 2020 002 514 A1 | 6/2020 | |
| DE | 102019108371 A1 * | 10/2020 | .......... H01M 50/249 |

OTHER PUBLICATIONS

Machine Translation of DE-102019108371-A1 (Year: 2019).*
German-language Search Report issued in German Application No. 10 2022 107 491.9 dated Nov. 9, 2022 with partial English translation (10 pages).

* cited by examiner

*Primary Examiner* — Gregg Cantelmo
(74) *Attorney, Agent, or Firm* — Crowell & Moring LLP

(57) ABSTRACT

A cell module for an electrical energy storage device of a motor vehicle includes at least one cell structure made up of energy storage cells, a metallic cell module frame, enclosing the at least one cell structure, for clamping the energy storage cells, and a measuring device for detecting a deformation of the cell module frame related to cell expansion. The measuring device includes a passive resistive extension sensor having a deformation-dependent electrical resistance and a measuring unit connected to the extension sensor to output an electrical measurement signal characterizing the deformation-dependent electrical resistance of the extension sensor. The extension sensor is formed by the metallic cell module frame, with which the measuring unit is electrically contacted.

9 Claims, 3 Drawing Sheets

CELL MODULE HAVING A MEASURING DEVICE FOR DETECTING DEFORMATION AND DAMAGE OF A CELL MODULE FRAME

CROSS REFERENCE TO RELATED APPLICATION

This application claims priority under 35 U.S.C. § 119 from German Patent Application No. 102022107491.9, filed Mar. 30, 2022, the entire disclosure of which is herein expressly incorporated by reference.

BACKGROUND AND SUMMARY

The invention relates to a cell module for an electrical energy storage device of a motor vehicle including at least one cell structure made up of energy storage cells, a metallic cell module frame, surrounding the at least one cell structure, for clamping the energy storage cells, and a measuring device for detecting a deformation of the cell module frame related to cell expansion. The invention additionally relates to an electrical energy storage device for a motor vehicle.

Interest is directed in the present case to electrical energy storage devices, which can be used, for example, as traction accumulators of electrified motor vehicles, thus electric or hybrid vehicles. Such an electrical energy storage device typically includes multiple cell modules, which are arranged in a storage device housing and are interconnected with one another. Each cell module includes multiple energy storage cells, which are arranged in a cell structure and, in particular in the case of prismatic cells or pouch cells, are enclosed by a cell module frame and clamped. The energy storage cells can expand due to cell aging and thus deform the cell module frame.

The cell module frames are typically designed here with respect to achieving a mechanical strength in the case of an expansion force of the energy storage cells occurring in operation, for example at a specific mileage or operating time, and with respect to further additionally relevant mechanical load cases, e.g., shock, vibration, crash, etc. When the expansion force of the energy storage cells increases enough that the strength of the cell module frame is exceeded and it is thus destroyed, the cell module thus "bursts" and an undefined, safety-relevant condition of the cell module results. This condition can require a service requirement or the shutdown of the motor vehicle.

Detecting the cell expansion is therefore known from the prior art. The expansion of the energy storage cells can be estimated via impedance measurement of the energy storage cells for this purpose, for example, and the cell expansion can thus be ascertained. The monitoring of the cell expansion via the impedance (change) is dependent on the installed components, however, and therefore requires accurate calibration.

It is the object of the present invention to provide a particularly simple solution for monitoring a cell expansion of energy storage cells of a cell module deforming a cell module frame of the cell module.

This object is achieved according to the invention by a cell module and an electrical energy storage device having the features according to the respective independent claims. Advantageous embodiments of the invention are the subject matter of the dependent claims, the description, and the figures.

A cell module according to the invention for an electrical energy storage device of a motor vehicle includes a cell structure made up of energy storage cells, a metallic cell module frame, enclosing the cell structure, for clamping the energy storage cells, and a measuring device for detecting a deformation of the cell module frame related to cell expansion. The measuring device has a passive resistive extension sensor having a deformation-dependent electrical resistance and a measuring unit connected to the extension sensor to output an electrical measurement signal characterizing the deformation-dependent electrical resistance of the extension sensor, wherein the extension sensor is formed by the metallic cell module frame, which is electrically connected to the measuring unit.

An electrical energy storage device according to the invention for a motor vehicle comprises at least one cell module according to the invention. The electrical energy storage device can be, for example, a high-voltage energy storage device and can be used as a traction accumulator or rechargeable traction battery for an electrically drivable motor vehicle. The electrical energy storage device can include a storage device housing, in which multiple cell modules are arranged and interconnected. The cell modules include the energy storage cells arranged in the at least one cell structure. The energy storage cells are designed in particular as prismatic cells or pouch cells and are stacked along a stack direction to form at least one cell structure in the form of a cell stack. The energy storage cells can be designed as liquid electrolyte cells or solid cells. The energy storage cells include cell terminals or cell poles, which are arranged on one side of the cell structure, for example on an upper side of the cell stack, and can be interconnected by means of a cell contacting system.

The cell module includes the metallic cell module frame to compress the energy storage cells. A metallic cell module frame is to be understood here as a cell module frame which is formed at least partially from a metal. In particular, at least one surface of the cell module frame consists of a metal. The cell module frame includes two metallic pressure plates, which are arranged on opposite end faces of the cell structure formed as a cell stack, and two metallic tie rods, which are mechanically connected to the pressure plates and which are arranged on lateral areas of the cell stack. The pressure plates and the tie rods are welded, for example.

Upon aging of the energy storage cells, they typically expand and apply an expansion force to the cell module frame, which can result in a deformation in particular at connecting points, for example weld seams, between the tie rods and the pressure plates. The deformation of the cell module frame is to be understood here as an extension or elongation, which can also include destruction, thus breaking open or tearing open, of the cell module frame, in particular a crack on at least one of the tie rods.

To detect a cell expansion, in particular a critical cell expansion, and an accompanying deformation of the cell module frame, the cell module includes the measuring device. The measuring device is designed at least to detect a critical deformation exceeding a predetermined threshold value, for example an imminent destruction of the cell module frame. Depending on the embodiment, the measuring device can also be designed to quantify the deformation.

The measuring unit is electrically connected to the metallic cell module frame, which forms the passive resistive extension sensor. Since the cell module frame is metallic, it is an electrical conductor which has a geometry-dependent, in particular cross section-dependent and length-dependent, electrical resistance. This resistance R is computed by $R = \rho l/A$, having the material-dependent specific resistance $\rho$, the cross section A, and the length l. Due to a crack on one of the tie rods, for example, the cross section of the cell module frame changes and thus its electrical resistance changes. This resistance change of the cell module frame is measurable by means of the measuring unit of the measuring device, which outputs the measurement signal dependent on the resistance. The measurement signal can be, for example, a resistance signal or a resistance-dependent voltage signal or a respective change of the corresponding signal.

The cell module frame functioning as an extension sensor is thus the first link in a measuring chain of the measuring device, which can include as further links the measuring unit and an evaluation unit. The evaluation unit can also be integrated into an evaluation device of the electrical energy storage device, for example a battery control unit, which is coupled for communication with the measuring unit. Since the cell module frame functions directly as an extension sensor or extension transducer, no further extension sensors, for example strain gauges, are thus required, on which the deformation of the cell module frame acts. The measuring unit outputs the measurement signal, which is dependent on resistance and thus deformation, and which can be passed on to the evaluation unit of the measuring device. The evaluation unit is designed, for example, to detect the critical deformation of the cell module frame on the basis of a comparison of the determined resistance signal to a predetermined reference resistance signal. The reference resistance signal can be, for example, an initial resistance signal which is determined specifically by cell module by the measuring device and is stored in the evaluation unit.

Such a measuring device, which uses the cell module frame as an extension sensor, is designed in a particularly simple, cost-effective, and material-saving manner.

The cell module preferably has a cell monitoring electronics unit having at least one monitoring sensor for detecting at least one parameter of the energy storage cells of the at least one cell structure, wherein a measuring circuit of the at least one monitoring sensor is designed to output an electrical measurement signal dependent on the parameter of the energy storage cell, is additionally connected to the cell module frame, and forms the measuring unit of the measuring device.

The cell monitoring electronics unit, which is also designated as a cell surveillance circuit (CSC), is thus also used to sense the cell module frame deformation. The cell monitoring electronics unit includes for this purpose the at least one monitoring sensor having the measuring circuit, which additionally forms the measuring unit of the measuring device. In particular, the at least one monitoring sensor is designed as a resistive temperature sensor for recording a parameter in the form of a temperature of the at least one energy storage cell and the measuring circuit is designed to output an electrical measurement signal dependent on the temperature of the energy storage cell.

The temperature sensor can be, for example, an NTC sensor, which is arranged for temperature measurement on at least one energy storage cell of the cell structure. The measuring circuit capable of resistance measurement can measure the resistance and/or the voltage of the temperature sensor as the measurement signal, for example. This measuring circuit capable of resistance measurement is additionally connected to the cell module frame and can sense the deformation of the cell module frame.

The cell module particularly preferably includes a cell contacting system, which comprises the cell monitoring electronics unit, cell connectors for interconnecting the energy storage cells, two module connections, which are electrically connected to the cell connectors and are designed as screw contacts, for contacting the cell module, and at least two metallic torque supports. The torque supports are connected in an electrically insulated manner to the screw contacts to absorb a torque during the screw connection of the screw contacts, are mechanically and electrically conductively connected to metallic pressure plates of the cell module frame to introduce the torque into the cell module frame, and are connected to the cell monitoring electronics unit to provide an electrical connection between the cell monitoring electronics unit and the cell module frame.

The cell connectors and the cell monitoring electronics unit can be held, for example, by a plastic carrier of the cell contacting system, which is placed on the side of the cell structure including the cell terminals of the energy storage cells. The cell connectors, which can be designed, for example, as sheet-metal strips, are positioned here on the cell terminals and are connected, for example welded, to the cell terminals to form an interconnection of the energy storage cells. The interconnection includes a first electrical connection, for example a positive pole, and a second electrical connection, for example a negative pole, which form the module connections. The module connections are designed in particular as high-voltage connections, at which a high-voltage potential of the interconnection of the energy storage cells is applied. The module connections are arranged here in the area of the opposing end faces of the cell stack and thus in the area of the pressure plates. The module connections are designed as screw contacts and are located due to the electrical connection to the interconnection of the energy storage cells in a power path, for example the high-voltage path, of the cell module. The cell module can be interconnected with other cell modules of the electrical energy storage device via the module connections. The module connections are electrically insulated with respect to the cell module frame.

To absorb the torque at the screw contacts during the contacting of the module connections and introduce it into the cell module frame, they are mechanically connected to, but electrically insulated from, the cell module frame via the torque supports. The screw contact and the respective torque supports can be extrusion coated using a plastic for the electrically insulated mechanical connection, for example. The torque supports can be designed, for example, as sheet-metal tabs and can be connected, for example welded or screwed, to an upper side of the pressure plates.

This design is based on the finding that there is already an electrical connection between the cell contacting system and the cell module frame via the torque supports, which moreover is not in the high-voltage path due to the electrically insulated mechanical connection to the screw contacts. To connect the cell module frame to the cell monitoring electronics unit, an electrical connection is established between the cell monitoring electronics unit and the torque supports. For example, for this purpose at least one signal line of the cell monitoring electronics unit, which is electrically connected to the measuring circuit and the evaluation unit, is electrically connected to the torque supports. Such a connection can be established particularly easily on the side of the cell contacting system and can thus be integrated into the cell contacting system. Upon the arrangement of the cell contacting system on the cell structure arranged in the cell module frame, the at least one measuring circuit is thus connected to the cell module frame while forming the measuring device.

A measuring device formed with the aid of the cell monitoring electronics unit and the cell module frame is designed in a particularly simple and material-saving manner. Only signal lines for contacting the cell module frame have to be provided.

The embodiments presented with reference to the cell module according to the invention and the advantages thereof apply accordingly to the electrical energy storage device according to the invention.

Further features of the invention result from the claims, the figures, and the description of the figures. The features and combinations of features mentioned above in the description and the features and combinations of features mentioned hereinafter in the description of the figures and/or solely shown in the figures are usable not only in the respective specified combination, but also in other combinations or alone.

Other objects, advantages and novel features of the present invention will become apparent from the following detailed description of one or more preferred embodiments when considered in conjunction with the accompanying drawings.

BRIEF DESCRIPTION OF THE DRAWINGS

Identical and functionally-identical elements are provided with identical reference signs in the figures.

DETAILED DESCRIPTION OF THE DRAWINGS

Figure 1:
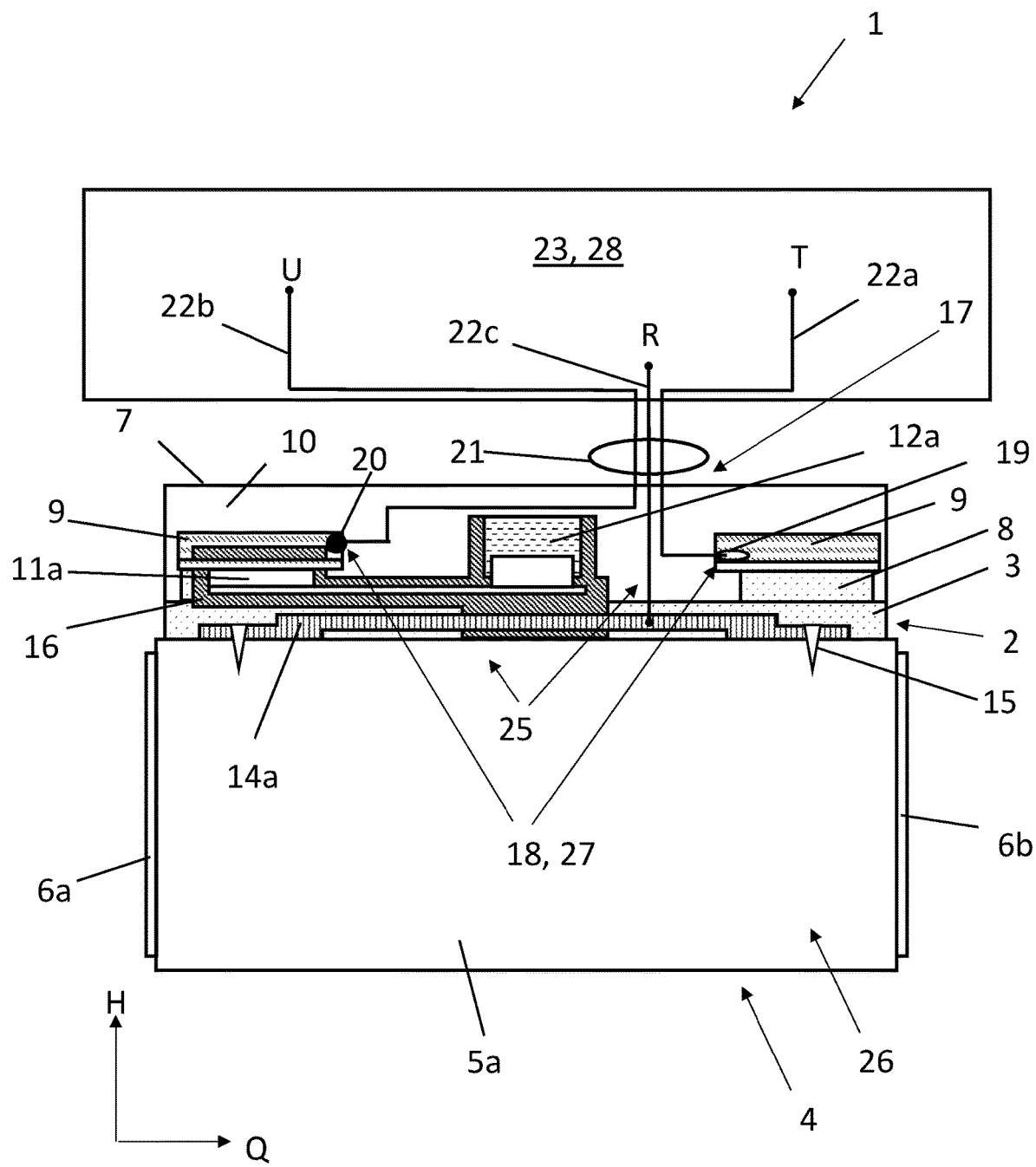
FIG. 1 is a schematic frontal view of a cell module for an electrical energy storage device.
Figure 2:
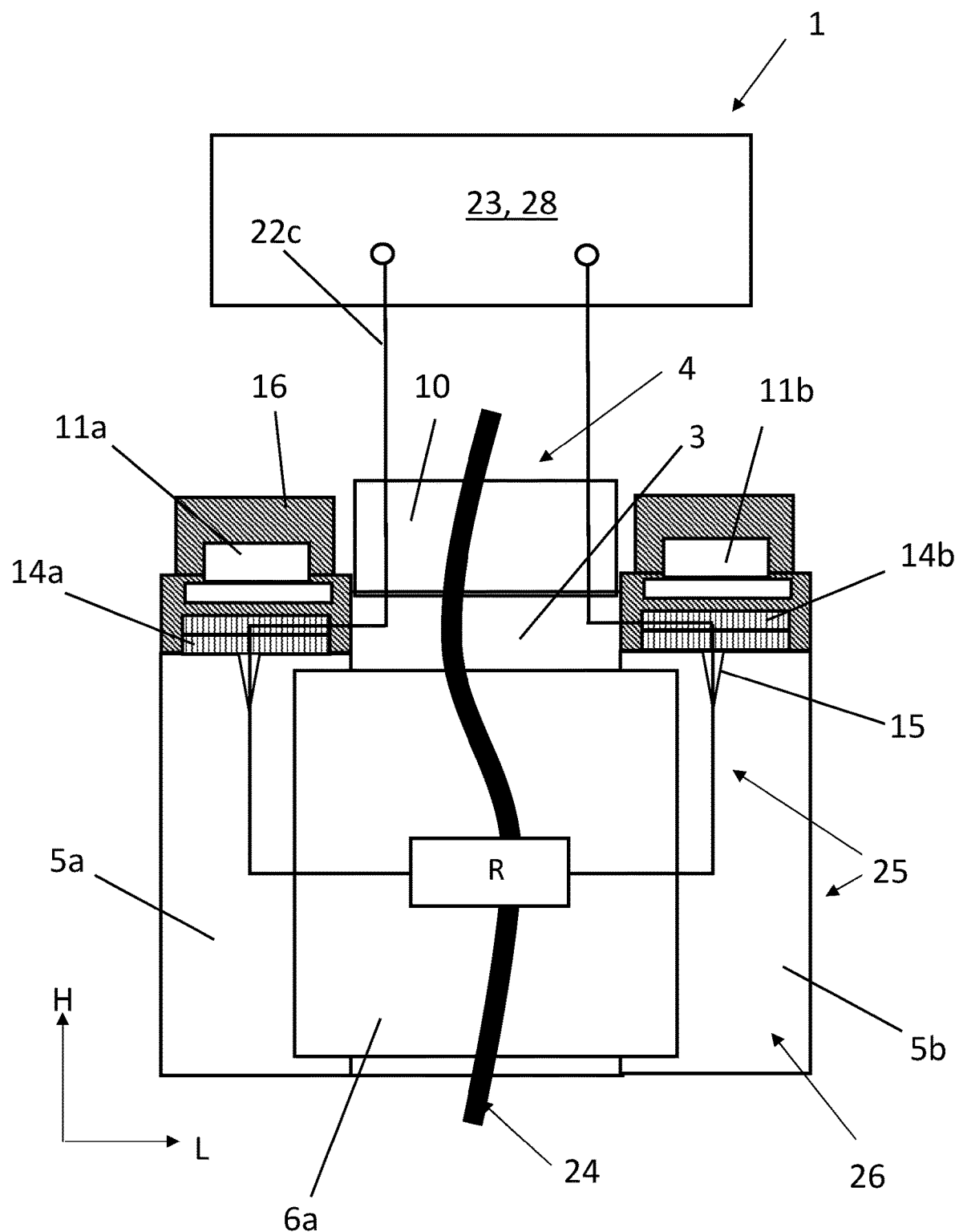
FIG. 2 is a schematic side view of the cell module.
Figure 3:
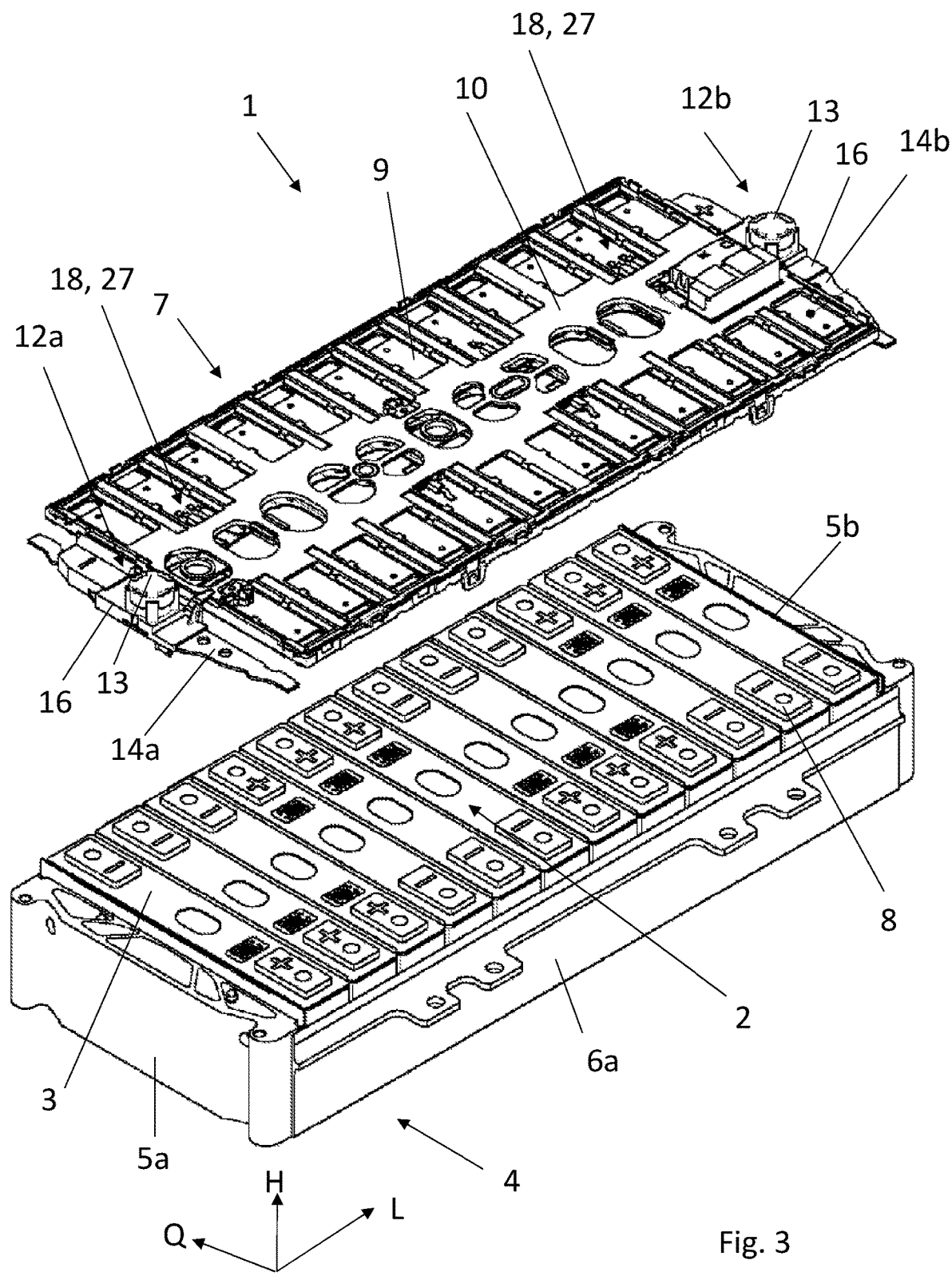
FIG. 3 is a perspective exploded illustration of the cell module.

FIG. 1 and FIG. 2 show different views of a cell module 1 for an electrical energy storage device of a motor vehicle in a schematic illustration. FIG. 3 shows a perspective exploded illustration of the cell module 1. The cell module 1 includes a cell structure 2 in the form of a cell stack, which comprises multiple energy storage cells 3 stacked along a longitudinal direction L. The cell structure 2 is enclosed by a metallic cell module frame 4, which is designed for clamping the energy storage cells 3. The metallic cell module frame 4 includes two pressure plates 5a, 5b and two tie rods 6a, 6b. The pressure plates 5a, 5b are opposite to one another in the longitudinal direction L and the tie rods 6a, 6b are opposite to one another in a transverse direction Q. The pressure plates 5a, 5b and the tie rods 6a, 6b are mechanically connected to one another, for example welded to one another. The cell module 1 includes a cell contacting system 7, which includes cell connectors 9 connected to cell terminals 8 of the energy storage cells 3, for interconnecting the energy storage cells 3 with one another. The cell connectors 9 are held by a carrier 10 of the cell contacting system 7, for example a plastic carrier, which is arranged here in a vertical direction H above the cell structure 2. Two of the cell connectors 9 are each connected via a current tap 11a, 11b to a module connection 12a, 12b of the cell module 1 for contacting the cell module 1.

The module connections 12a, 12b are, as shown in FIG. 3, designed as screw contacts 13. The module connections 12a, 12b are each connected via a metallic torque support 14a, 14b to the cell module frame 4. These torque supports 14a, 14b prevent the screw contacts 13 from loosening upon the contacting of the cell module 1 via the module connections 12a, 12b. The module connections 12a, 12b, which are designed in particular as high-voltage interfaces, are connected here via a welded bond 15 to the pressure plates 5a, 5b. An electrically conductive connection between the torque supports 14a, 14b and the cell module frame 4 arises via the welded bond 15. To prevent an electrical connection between the module connections 12a, 12b and the pressure plates 5a, 5b and thus incorporation of the cell module frame 4 into the high-voltage path, the module connections 12a, 12b are mechanically connected via an electrical insulation 16, for example a plastic extrusion coating, to the respective torque support 14a, 14b.

The cell contacting system 4 additionally includes a cell monitoring electronics unit 17, which is designed for monitoring the energy storage cells 3. For this purpose, the cell monitoring electronics unit 17 includes multiple monitoring sensors 18, for example a temperature sensor 19 for sensing a cell temperature T and a voltage sensor 20 for sensing a cell voltage U, which are electrically coupled with some of the cell connectors 8 and which are coupled here for communication via a wiring harness 21 having signal lines 22a, 22b to an evaluation device 23 of the cell monitoring electronics unit 17, for example a battery control unit.

Upon cell aging or upon charging of the electrical energy storage device, for example, it can occur that the energy storage cells 3 expand. If this cell expansion exceeds a critical threshold value, a critical deformation 24 of the cell module frame 4 can occur, for example a crack in one of the tie rods 6a, 6b. To be able to detect at least the critical deformation 24, the cell module 1 includes a measuring device 25. The measuring device 25 includes a resistive passive extension sensor 26 and a measuring unit 27. The extension sensor 26 has an electrical resistance R dependent on the deformation 24 of the cell module frame 4, wherein the measuring unit 27 is designed to measure this resistance R or a measurement signal dependent on the resistance R. An evaluation unit 28 of the measuring device 25 evaluates the measurement signal and detects at least the critical deformation 24.

The measuring device 25 is formed here by components already present on the cell module 1. The extension sensor 26 is formed by the metallic cell module frame 4 itself, which includes an electrical conductor having a deformation-dependent electrical resistance R. The measuring unit 27 is formed with the aid of the monitoring sensor units 18 of the cell monitoring electronics unit 17, which is electrically connected to the cell module frame 4. For this purpose, a signal line 22c is electrically connected to the cell module frame 4 and to the evaluation unit 28, wherein the evaluation unit 28 is formed here by the evaluation device 23. To electrically contact the cell monitoring electronics unit 17 with the cell module frame 4, the cell monitoring electronics unit 17 is electrically connected via the signal line 22c to the torque supports 14a, 14b, which are in turn electrically connected to the pressure plates 5a, 5b via the welded bond 15. The cell monitoring electronics unit 17 is thus interconnected with both pressure plates 5a, 5b. If the cell module frame 4 now deforms, its cross section thus changes, for example due to the crack, and thus its electrical resistance R changes. This change of the resistance R can be detected, for example, by means of the monitoring sensors 18 of the cell monitoring electronics unit 17, which form the measuring unit 27.

For example, the measuring device 25 can determine an initial resistance of the cell module frame 24, which is specific to the cell module due to different line lengths to the cell monitoring electronics unit 17, a weld seam quality, material quality, etc. The resistance can then be monitored continuously or at specific points in time (for example at the beginning and end of the charging, in particular at 80% SoC, upon start up, etc.), and assessed with respect to deviation in relation to the initial resistance, which is thus used as a reference signal.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cell module for an electrical energy storage device of a motor vehicle, comprising:
    at least one cell structure made up of energy storage cells;
    a metallic cell module frame, enclosing the at least one cell structure, for clamping the energy storage cells;
    a measuring device for detecting a deformation of the cell module frame related to cell expansion, wherein
        the measuring device comprises a passive resistive extension sensor having a deformation-dependent electrical resistance and a measuring unit connected to the extension sensor to output an electrical measurement signal characterizing the deformation-dependent electrical resistance of the extension sensor,
        the extension sensor is formed by the metallic cell module frame, with which the measuring unit is electrically contacted,
        the cell module frame comprises two metallic pressure plates, which are arranged on opposite end faces of the cell structure formed as a cell stack, and two metallic tie rods, which are mechanically connected to the pressure plates and which are arranged on lateral areas of the cell stack, and
        the measuring device is configured to detect a crack in at least one of the tie rods as the deformation of the cell module frame.

2. The cell module according to claim 1, wherein
the measuring device further comprises an evaluation unit, which is configured to detect a critical deformation based on a comparison of the electrical measurement signal to a predetermined reference signal.

3. The cell module according to claim 1, further comprising:
    a cell monitoring electronics unit having at least one monitoring sensor for sensing at least one parameter of the energy storage cells of the at least one cell structure, wherein
    a measuring circuit of the at least one monitoring sensor is configured to output an electrical measurement signal dependent on the at least one parameter of the energy storage cell, and is additionally connected to the cell module frame, and forms the measuring unit of the measuring device.

4. The cell module according to claim 3, wherein
the at least one monitoring sensor is configured as a resistive temperature sensor for recording a parameter in the form of a temperature of the at least one energy storage cell, and
the measuring circuit is additionally configured to output an electrical measurement signal dependent on the temperature of the energy storage cell.

5. An electrical energy storage device for a motor vehicle comprising at least one cell module according to claim 1.

6. A cell module for an electrical energy storage device of a motor vehicle, comprising:
    at least one cell structure made up of energy storage cells;
    a metallic cell module frame, enclosing the at least one cell structure, for clamping the energy storage cells;
    a measuring device for detecting a deformation of the cell module frame related to cell expansion, wherein
        the measuring device comprises a passive resistive extension sensor having a deformation-dependent electrical resistance and a measuring unit connected to the extension sensor to output an electrical measurement signal characterizing the deformation-dependent electrical resistance of the extension sensor,
        the extension sensor is formed by the metallic cell module frame, with which the measuring unit is electrically contacted;
    a cell monitoring electronics unit having at least one monitoring sensor for sensing at least one parameter of the energy storage cells of the at least one cell structure, wherein
        a measuring circuit of the at least one monitoring sensor is configured to output an electrical measurement signal dependent on the at least one parameter of the energy storage cell, and is additionally connected to the cell module frame, and forms the measuring unit of the measuring device;
    cell connectors for interconnecting the energy storage cells,
    two module connections, which are electrically connected to the cell connectors and are configured as screw contacts, for contacting the cell module, and
    at least two metallic torque supports, which are connected in an electrically insulated manner to the screw contacts to absorb a torque during screwed connection of the screw contacts, are mechanically and electrically conductively connected to metallic pressure plates of the cell module frame to introduce the torque into the cell module frame, and are connected to the cell monitoring electronics unit to provide an electrical connection between the cell monitoring electronics unit and the cell module frame.

7. The cell module according to claim 6, wherein
the screw contacts and the respective torque supports are extrusion coated using a plastic for the electrically insulated mechanical connection.

8. The cell module according to claim 6, wherein
the torque supports are welded to the respective pressure plate to establish the mechanical and electrical connection.

9. The cell module according to claim 6, wherein
at least one signal line of the cell monitoring electronics unit, which is electrically connected to the measuring circuit and an evaluation unit, is electrically connected to the torque supports.

* * * * *